Figure 8:
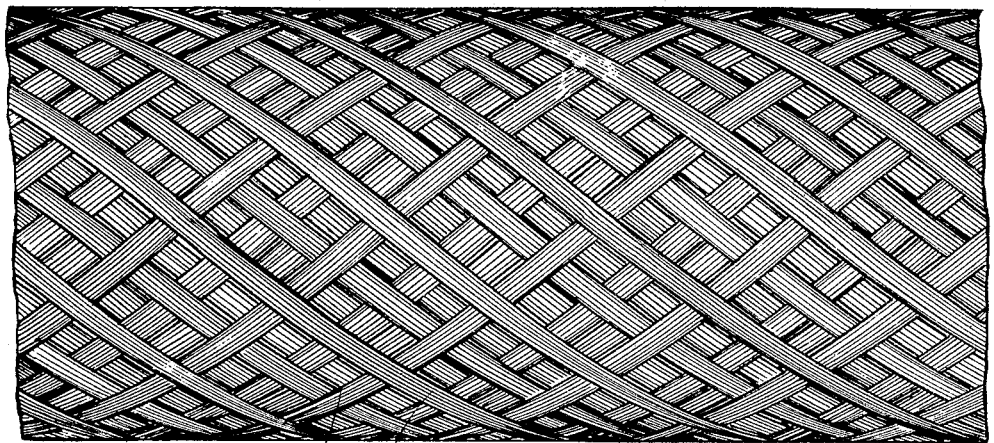

L. A. SUBERS.
LAMINATED COHESIVE INTERWOUND FABRIC.
APPLICATION FILED JAN. 31, 1910.
1,024,915.
Patented Apr. 30, 1912.
13 SHEETS—SHEET 1.
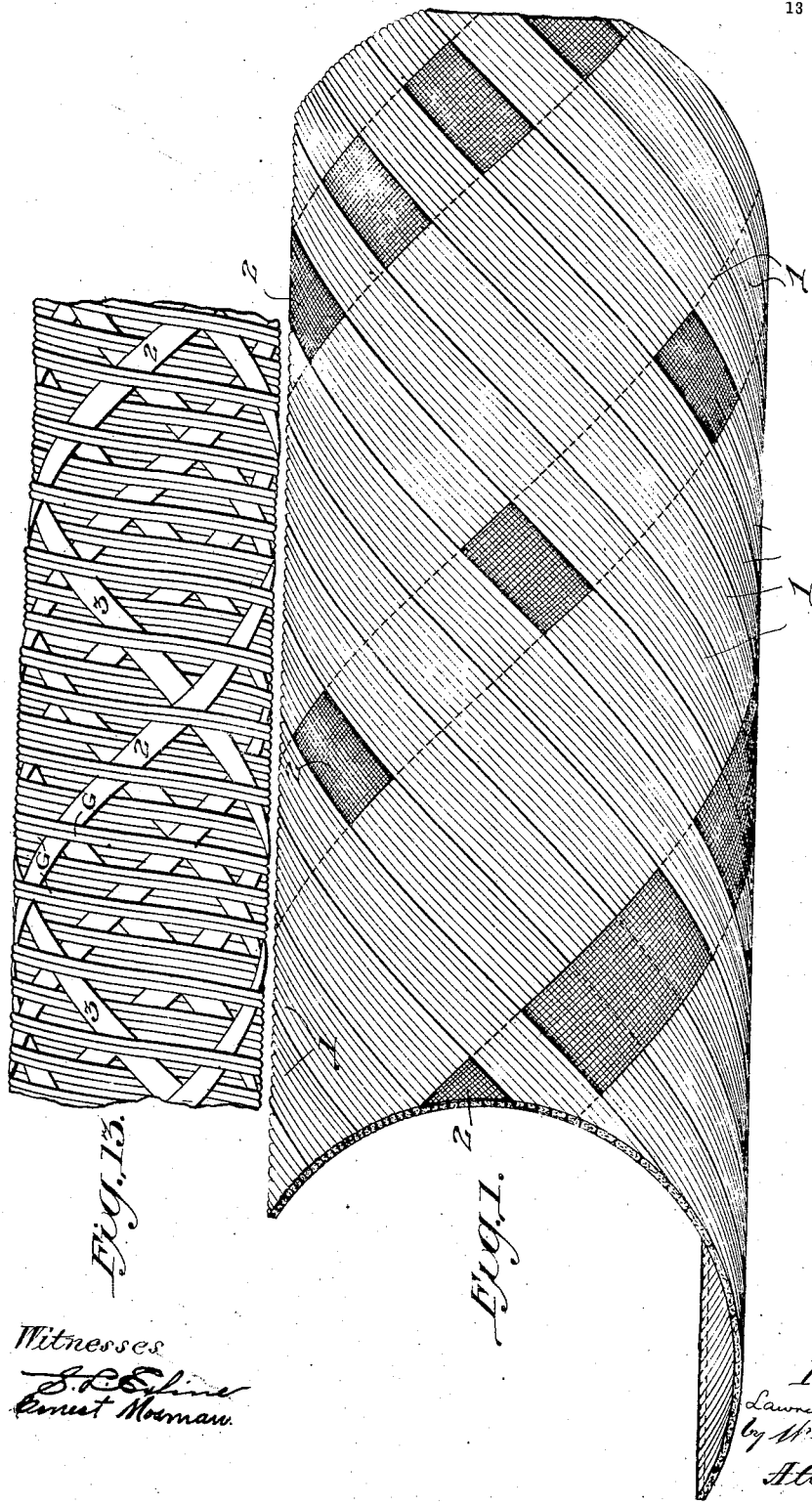

L. A. SUBERS.
LAMINATED COHESIVE INTERWOUND FABRIC.
APPLICATION FILED JAN. 31, 1910.
1,024,915.
Patented Apr. 30, 1912.
13 SHEETS—SHEET 2.
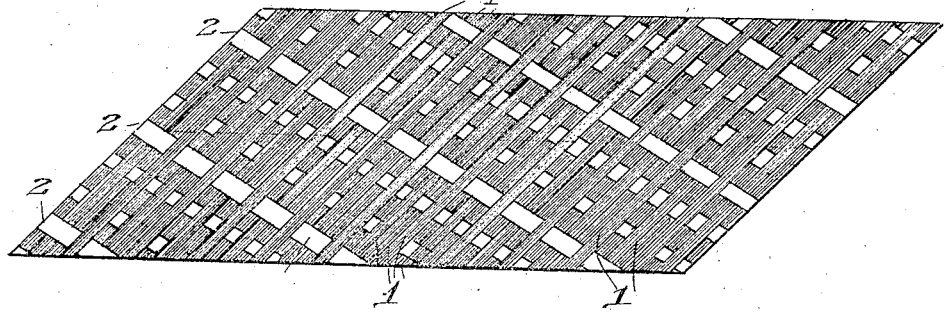
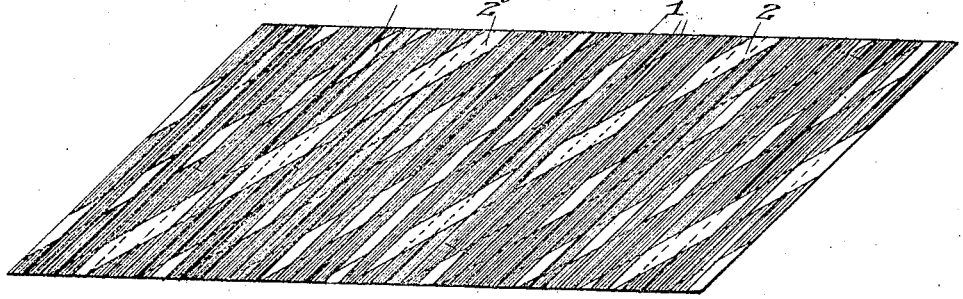
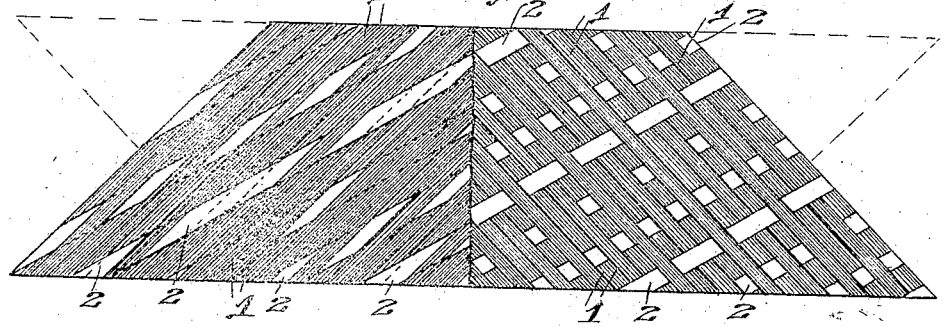

L. A. SUBERS.
LAMINATED COHESIVE INTERWOUND FABRIC.
APPLICATION FILED JAN. 31, 1910.
1,024,915.
Patented Apr. 30, 1912.
13 SHEETS—SHEET 3.
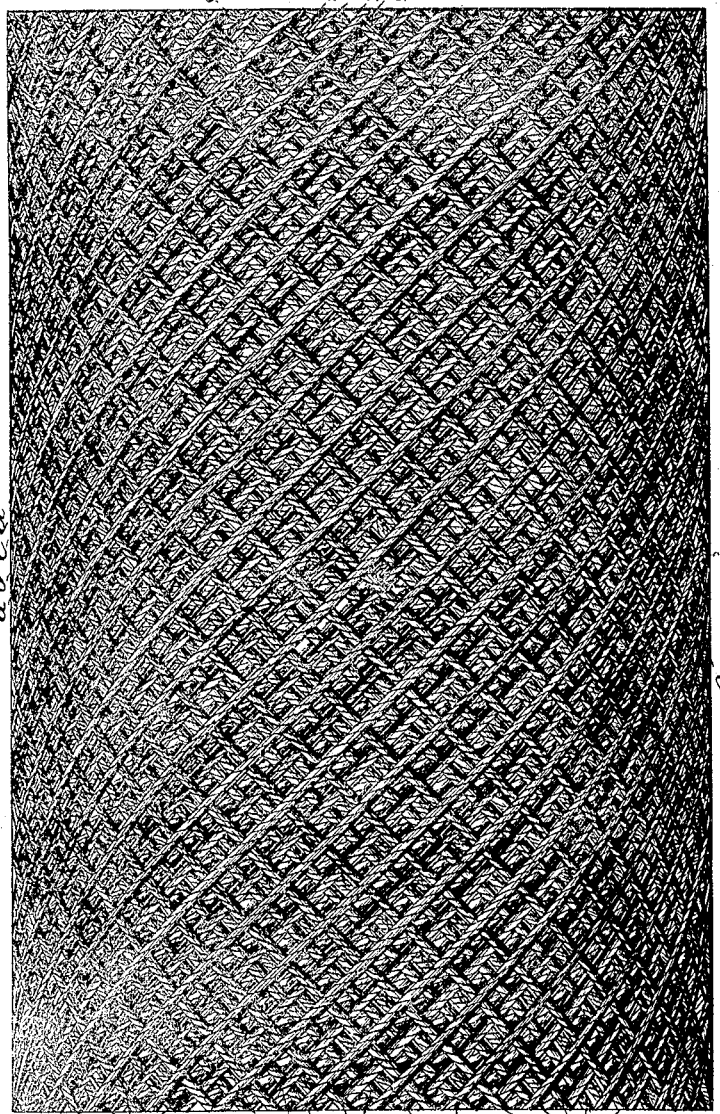
  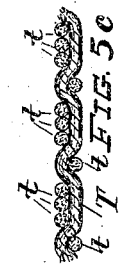  

L. A. SUBERS.
LAMINATED COHESIVE INTERWOUND FABRIC.
APPLICATION FILED JAN. 31, 1910.
1,024,915.
Patented Apr. 30, 1912.
13 SHEETS—SHEET 4.
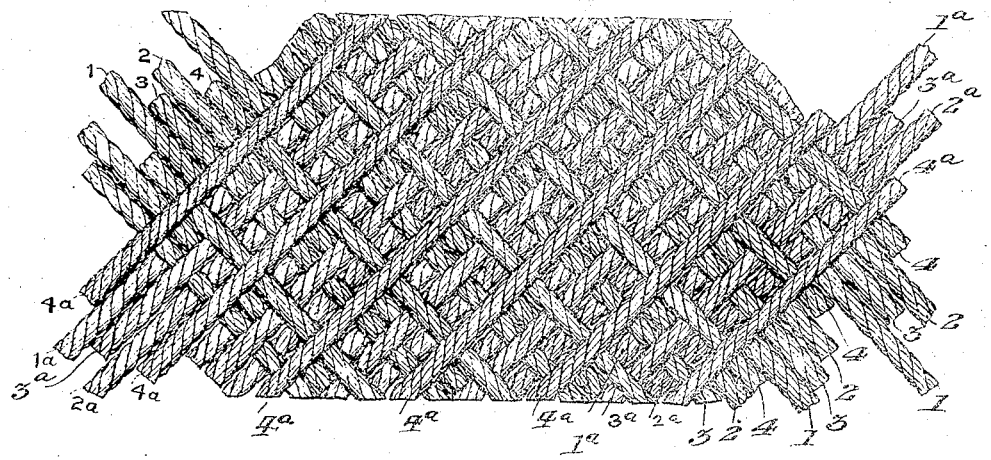
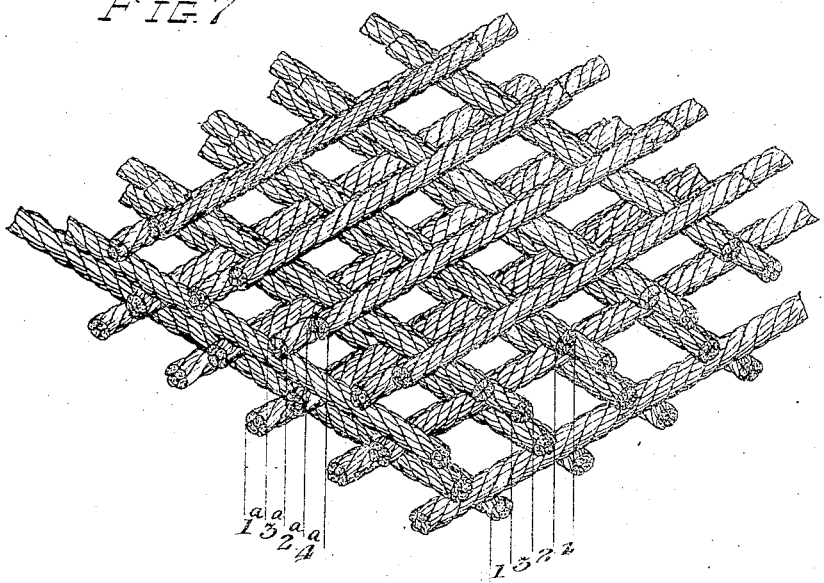
Witnesses.
Ernest Mosman.
Inventor
Lawrence A. Subers
By
Attorney L. A. SUBERS.
LAMINATED COHESIVE INTERWOUND FABRIC.
APPLICATION FILED JAN. 31, 1910.

1,024,915.

Patented Apr. 30, 1912.

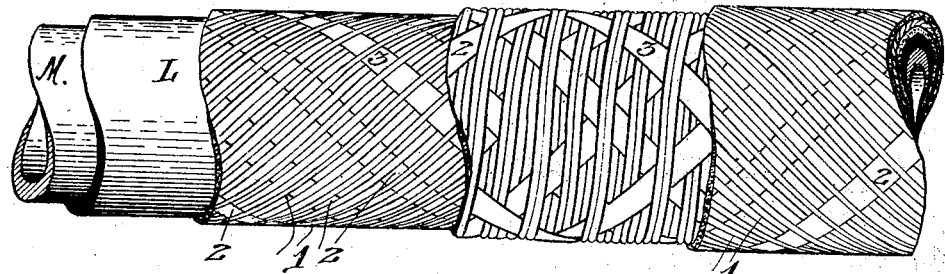
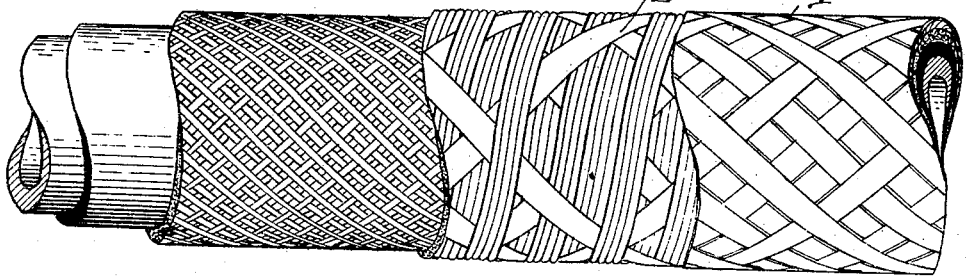
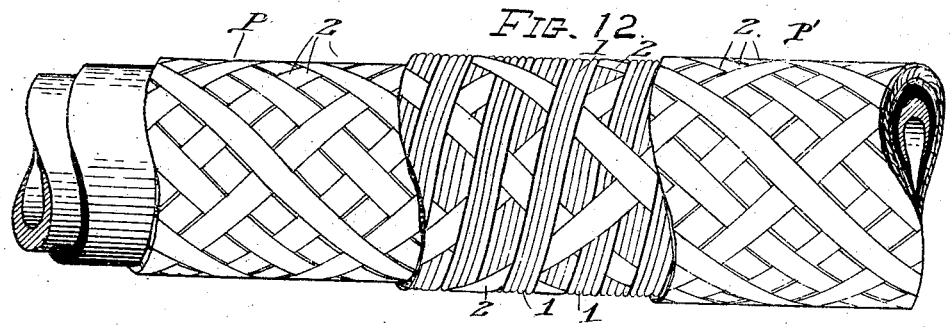

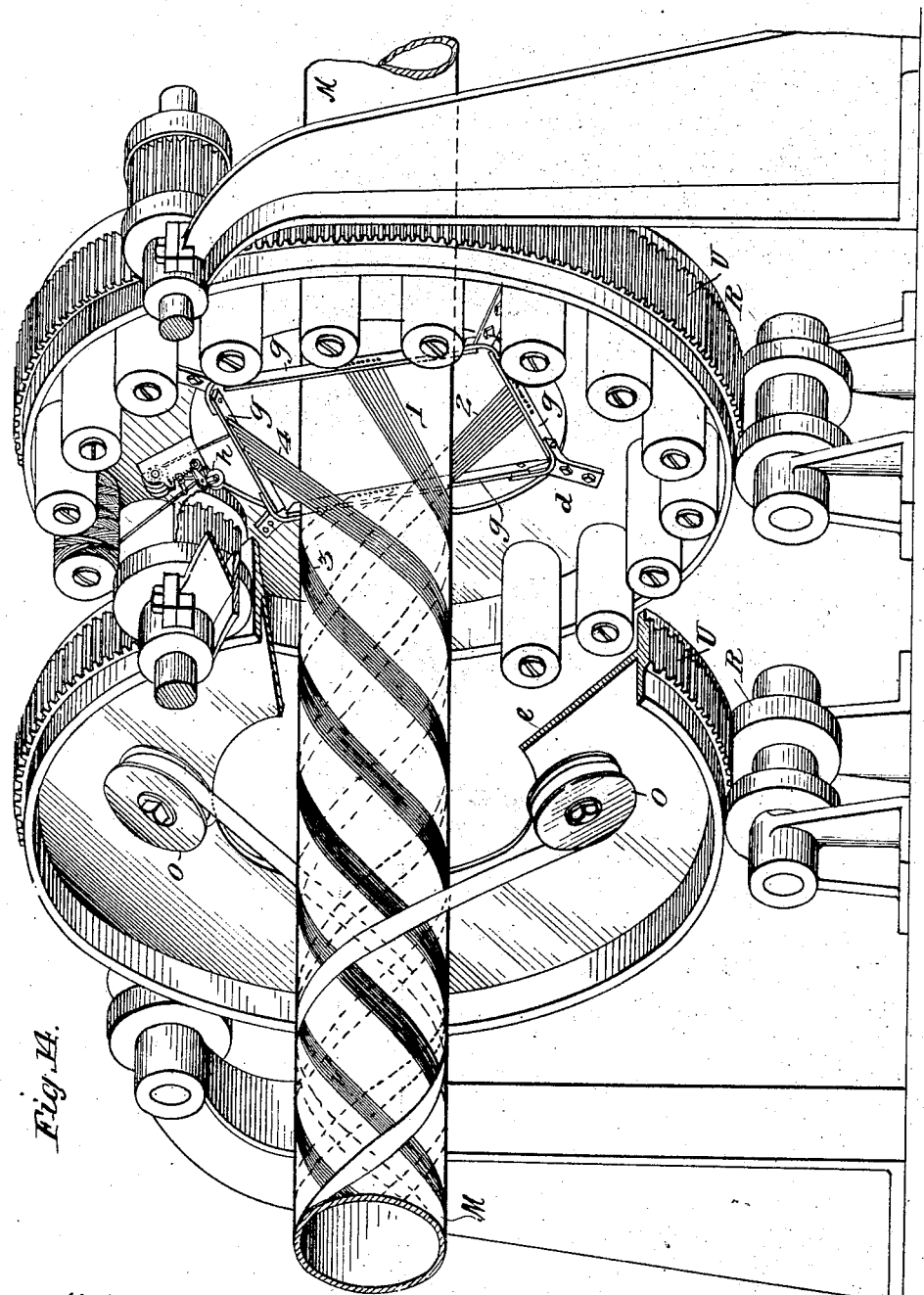

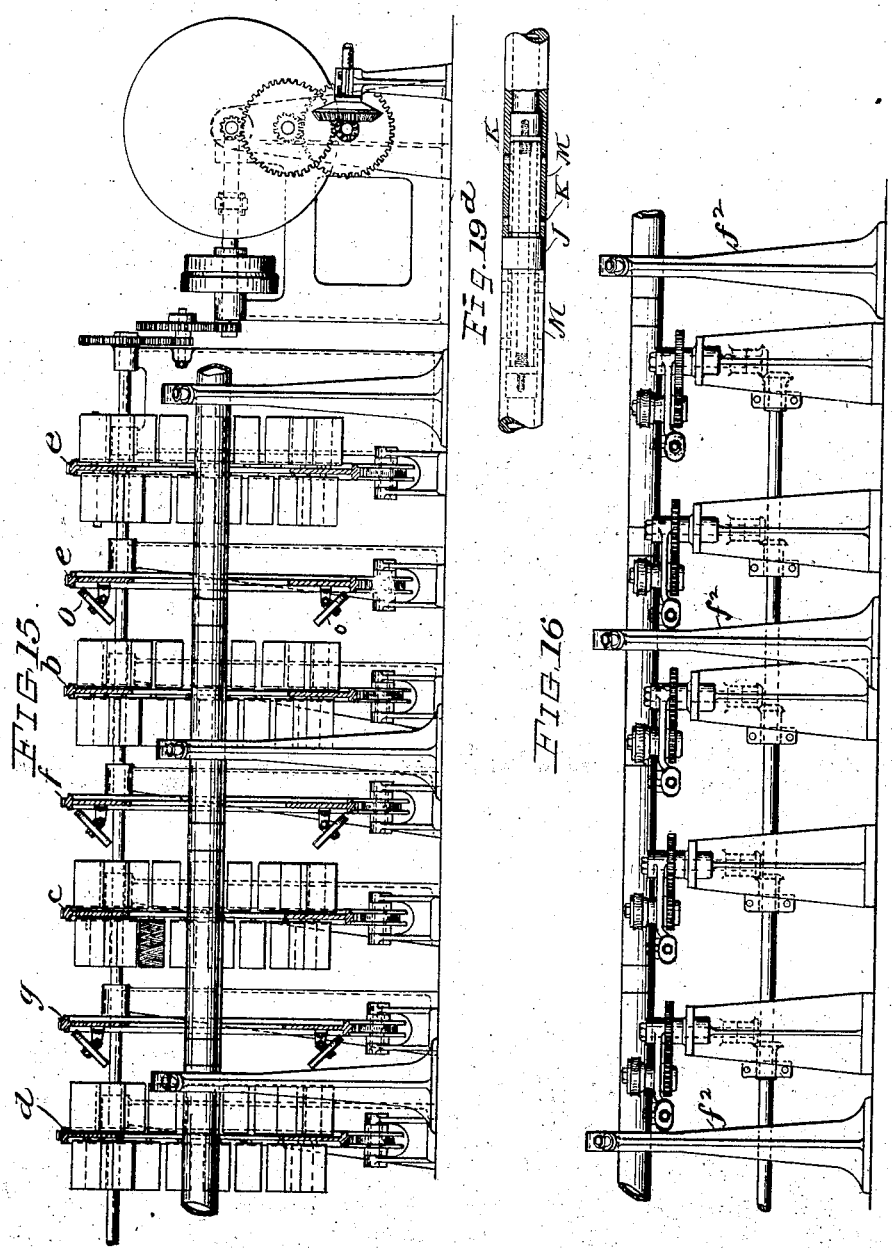

L. A. SUBERS.
LAMINATED COHESIVE INTERWOUND FABRIC
APPLICATION FILED JAN. 31, 1910.

1,024,915.

Patented Apr. 30, 1912.

13 SHEETS—SHEET 9.

L. A. SUBERS.
LAMINATED COHESIVE INTERWOUND FABRIC.
APPLICATION FILED JAN. 31, 1910.

1,024,915.

Patented Apr. 30, 1912.
13 SHEETS—SHEET 10.

Witnesses:
Ernest Mosman

Inventor:
Lawrence A. Subers
By Wm. M. Monroe
Attorney.

L. A. SUBERS.
LAMINATED COHESIVE INTERWOUND FABRIC.
APPLICATION FILED JAN. 31, 1910.
1,024,915.
Patented Apr. 30, 1912.
13 SHEETS—SHEET 11.
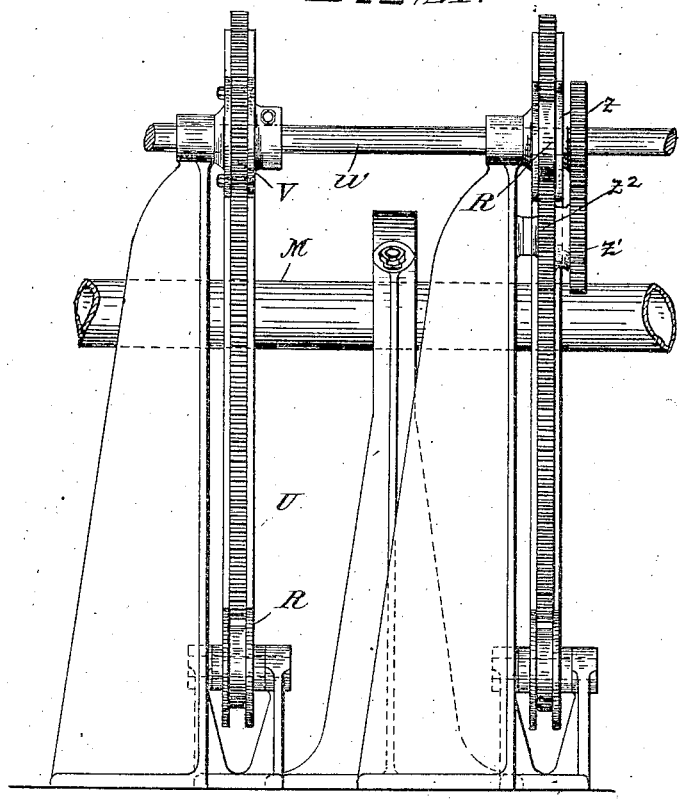
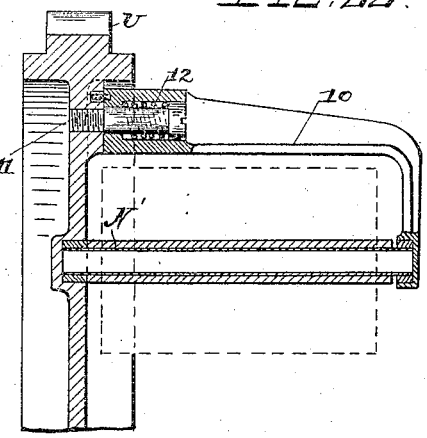

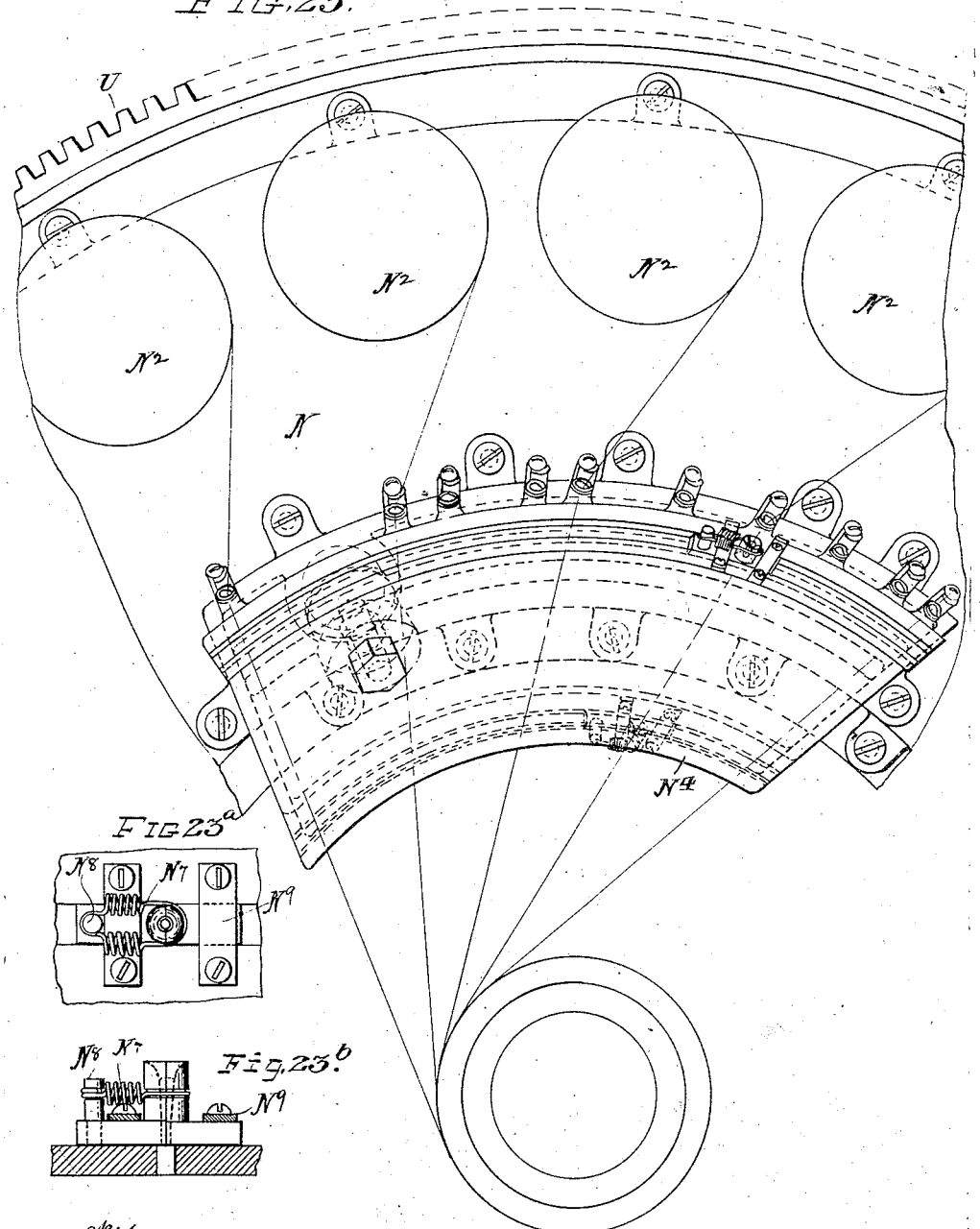

L. A. SUBERS.
LAMINATED COHESIVE INTERWOUND FABRIC.
APPLICATION FILED JAN. 31, 1910.

1,024,915.

Patented Apr. 30, 1912.
13 SHEETS—SHEET 13.

UNITED STATES PATENT OFFICE.

LAWRENCE A. SUBERS, OF CLEVELAND, OHIO.

LAMINATED-COHESIVE-INTERWOUND FABRIC.

1,024,915.

Specification of Letters Patent.   Patented Apr. 30, 1912.

Application filed January 31, 1910. Serial No. 540,982.

*To all whom it may concern:*

Be it known that I, LAWRENCE A. SUBERS, a citizen of the United States, and resident of Cleveland, in the county of Cuyahoga and State of Ohio, have invented certain new and useful Improvements in Laminated-Cohesive-Interwound Fabric, of which I hereby declare the following to be a full, clear, and exact description, such as will enable others skilled in the art to which it appertains to make and use the same.

The objects of the invention are to provide a laminated, unwoven fabric composed of fibrous members cohering in an adhesive material, such as rubber, and it is adapted for many uses such as for sheet fabric or flexible tubing. It is also new in the art, and it is characterized by great flexibility and strength, combined with elasticity and durability in use. The fabric is laminated, not woven, braided, interlocked, or interlaced in any manner, and is composed of series of fibrous bands or cords, the first of a certain number of series wound parallel to each other at a predetermined angle on a mandrel, so spaced that the remainder of these series would just fill the space between the members of the first series, and an equal number of series similarly spaced, wound parallel to each other at a reverse angle, the first of the latter series wound on top of the first of the former series, and the remainder of each series wound alternately in the same order, being compressed to fill the openings and cohering together in a coating of adhesive material, which may be vulcanizable.

This fabric is preferably made in tubular form upon a drum or mandrel by winding the fibrous members or bands thereon in rubber, and may be made of any desired length or widths according to the diameter and length of the drum or mandrel upon which it is wound. In this fabric the bands may be composed of series of spirally running cords or threads equally spaced apart and are rubbered and alternated with series of similar members or with fabric members of any character and all elements adhere together and are compressed together to produce a continuous surface and the bands of fibrous material are separated by equal spaces which may be of the same width as the bands or of a multiple number of bands and some of the bands may be designed to cover only a predetermined amount of the surface and may be used merely for reinforcing the fabric according to the character of the fabric desired and its use.

The parallel cords or threads or groups of parallel cords or threads which may form the bands are designed preferably to form the body and substance of the fabric, and some of the bands may be employed as a reinforcing means and may or may not increase the thickness of the fabric or lessen its flexibility or elasticity in any manner, and may serve only as a binding influence for the bands of cords or threads, and as distributing means or instrumentalities for strain, tension or shock, that may be imparted to the fabric, and hence when so used are preferably arranged at such an angle as not to interfere with the action of the fabric, but to afford a support therefor, under all conditions of shock or flexure.

The invention of the fabric and the method of making the same is illustrated in the accompanying drawings, hereinafter more fully described and specifically pointed out in the claims.

Figure 9:
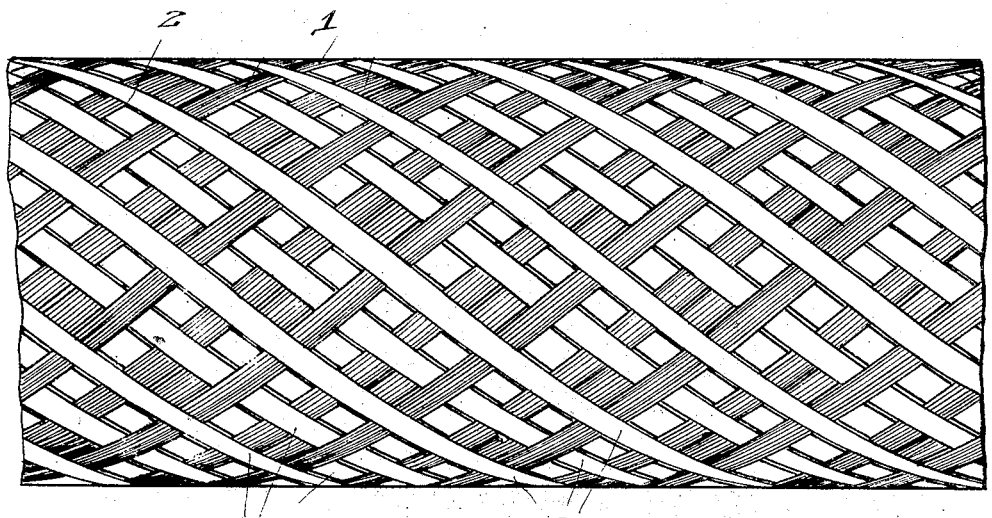
Figure 17:
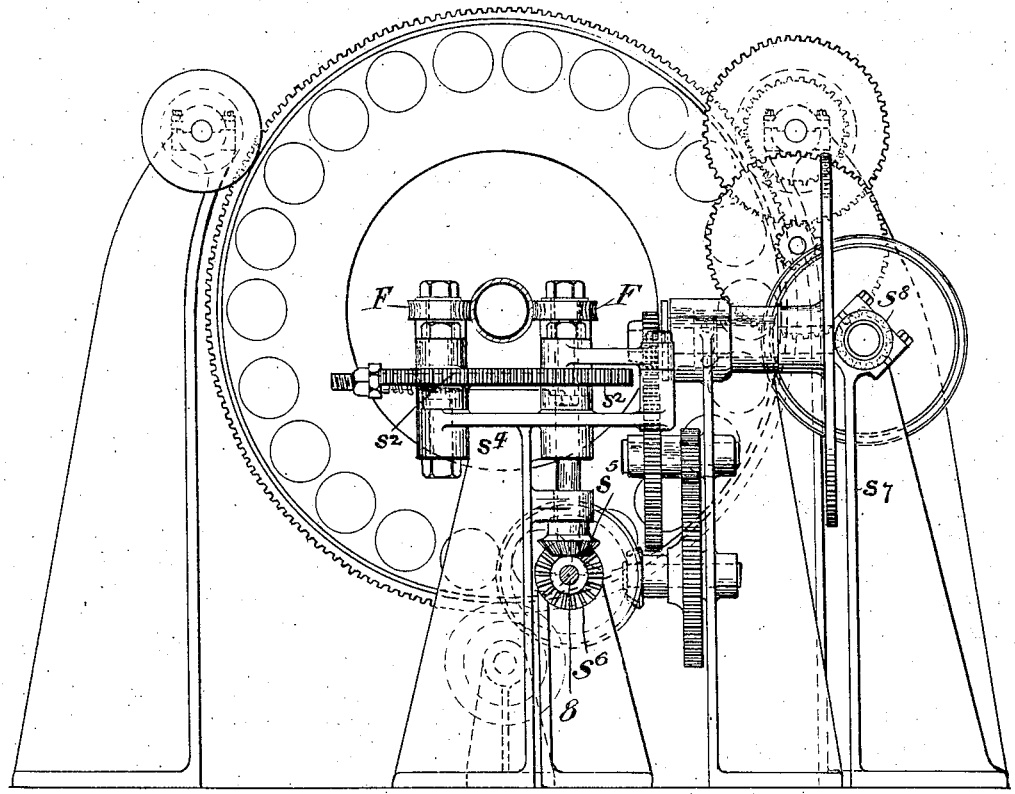
Figure 18:
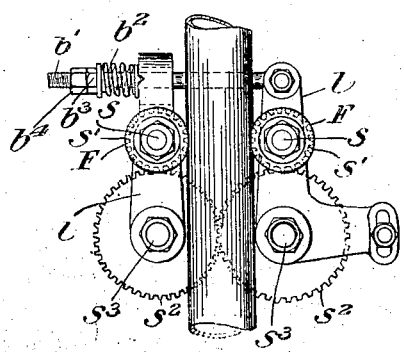
Figure 19:
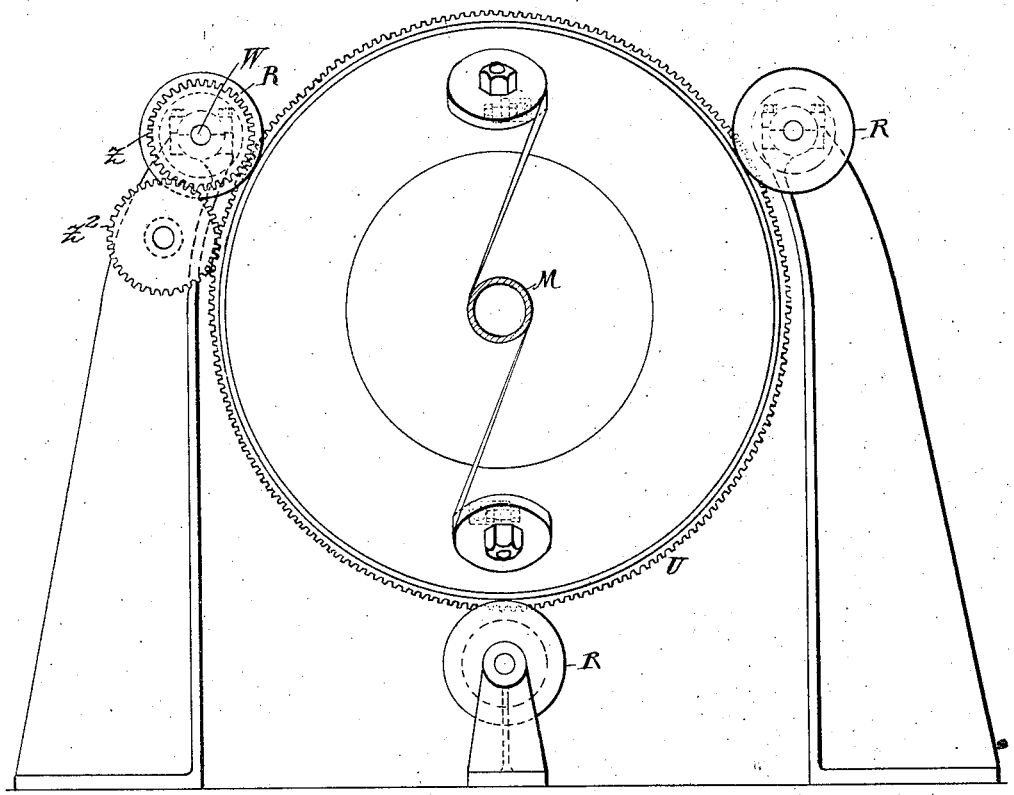
Figure 20:
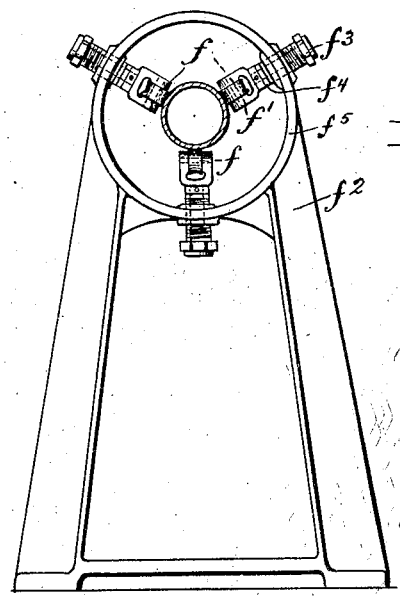
Figure 24:
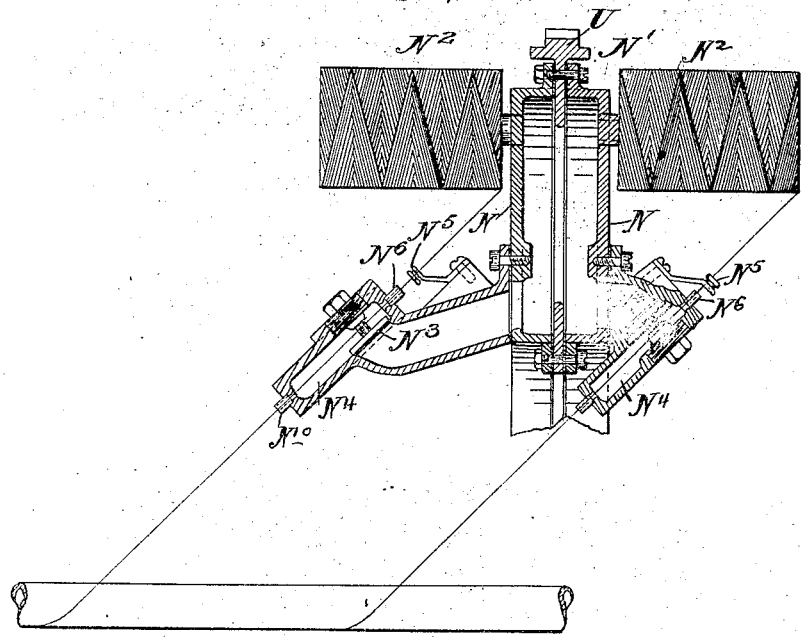
Figure 25:
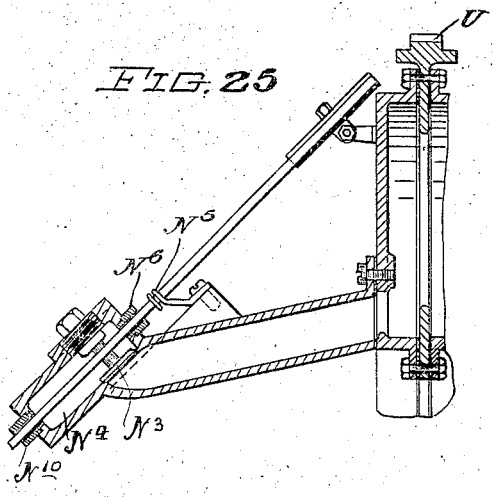

In the accompanying drawings Figure 1 is a perspective view showing a portion of fabric formed upon a cylindrical surface such as a mandrel, and cut longitudinally therefrom at one side, showing bands of regularly spaced parallel adhering cords or threads and reinforcing bands of tape equally spaced apart, all parallel members being interwound to fill all the spaces between them. Fig. 2 is a plan view of a similar fabric layer in which the same characteristics of structure are observed, and the same system of employing tape or other fibrous bands in connection with groups or bands of cords or threads, the bands of tape being spaced more closely together to increase the strength of the reinforcing element. Fig. 3 is a similar view showing the groups or bands of cords or threads laid at an angle of 45° to the edge of the fabric and the bands of tape or other reinforcing element laid at an angle of approximately 30° to the edge of the fabric or at an angle of approximately 15° to the edges of the fabric or at an angle of approximately 15° to the edges of the bands of cords or threads; Fig. 4 is a plan view showing the layers of Fig. 2 superimposed upon the layer of Fig. 3; Fig. 5 is an elevation of a fabric formed on a mandrel showing all fibrous elements composed of single cords or threads interwound by the improved method; Fig. 5ᵃ is a transverse section of this fabric taken on line a—a Fig. 5; Fig. 5ᵇ is a transverse section of this fabric taken on line b—b Fig. 5; Fig. 5ᶜ is a transverse section of this fabric taken on line c—c Fig. 5; Fig. 5ᵈ is a transverse section of this fabric taken on line d—d Fig. 5; Fig. 5ᵉ is a transverse section of this fabric taken on line e—e Fig. 5; Fig. 6 is an enlarged plan view of a portion of the same; Fig. 7 is an isometrical perspective view of the same showing the position of the several series of cords before they are compressed together to form a two ply fabric; Fig. 8 is an elevation of a piece of fabric before cutting from the mandrel showing one layer composed of groups of cords or threads interlaid at an angle of 90° with each other and at approximately 45° to any longitudinal surface line, both elements being alike, and composed of groups of cords or threads; Fig. 9 is a similar view of a portion of fabric showing groups or bands of cords or threads laid in one direction and bands of the reinforcing element interwound therewith at an angle of 90° both elements being at an angle of approximately 45° to any longitudinal surface line; Fig. 10 shows a layer of fabric such as shown in Fig. 1 overlaid with a layer of fabric in which circumferentially or transversely laid bands or groups consisting each preferably of two cords or threads are employed with bands of the reinforcing tape or element, and these bands are arranged in two divisions or systems alternating with the groups of cords or threads and with each other, one system of reinforcing bands crossing the other system at 90° and each system of reinforcing bands crossing the bands of cords or threads at approximately 45°, and a third layer is shown similar to the first layer, but with the elements at right angles to the elements of the first layer; Fig. 11 is a similar view of a piece of fabric in which the first layer is composed wholly of interwound cords or threads as shown in Fig. 5, and the second layer is composed of bands of cords or threads running transversely or circumferentially around the tube, and the reinforcing bands are laid alternately with the bands of cords or threads and across each other at an angle of approximately 90° and cross the bands of cords or threads at an angle of approximately 45°; an outer layer is shown composed wholly of bands of frictioned tape interlaid and interwound similarly to the structure shown in Figs. 8 and 9; Fig. 12 is a similar view showing the first and outer layer of fabric similar in construction to the fabric shown in Fig. 9, and the intermediate layer similar to the intermediate layer shown in Fig. 11; Fig. 13 is an elevation of a piece of fabric showing one layer similar to the intermediate layer shown in Fig. 10. Figs. 14 to 25 inclusive illustrate a type of machine invented by myself by means of which the improved process of manufacturing the improved fabric and tubing can be continuously carried on and may be described as follows:—Fig. 14 is an isometric view showing a mandrel, and disks or reels encircling the same, one reel provided with two tape carrying spools, and the other reel provided with cord or thread carrying tubes. These disks are rotatable in opposite directions about the mandrel, which has a longitudinal movement, so that the cords or threads are laid spirally thereon, in groups or bands and the tape is spirally laid upon the cords or threads, thus forming the first laid elements of the fabric. Means is also shown for providing a tension for one cord or thread, a tension device of the same character being applied in use to all the cords or threads. This view illustrates the first step of the process; Fig. 15 is a longitudinal section of the tubular fabric making machine showing four reels for laying cord or thread, and three reels for laying tape, adapted to form in continuous process one layer of fabric similar to that shown in Fig. 1; each cord or thread reel adapted to apply cord or thread for four bands, as shown in Fig. 14. In this view are also shown friction gears by means of which a mandrel of predetermined size can be driven at variable speeds, and also means for operating the mandrel propelling device; Fig. 15 is a longitudinal section of the mandrel and mandrel coupling device; Fig. 16 shows a continuation of the mandrel and propelling means therefor; Fig. 17 is an end elevation of the machine shown in Figs. 15 and 16; Fig. 18 is a plan view of one of the propelling devices for the mandrel; Fig. 19 is an end view of one of the tape reels showing the three point roller supports and driving gears therefor; Fig. 20 is an end elevation of one of the mandrel supports; Fig. 21 is a rear elevation of two reels, one for cord or thread and one for tape, showing the reversing mechanism for the tape reel; Fig. 22 is a longitudinal section of one of the tube or spool sockets or supports, showing the outer rotatable arm and its means of attachment to its reel; Fig. 23 shows the construction of a reel adapted to laying rubbered cords or threads and the rubber receptacle therefor; Fig. 23ᵃ is a plan view enlarged, of a compression thread guide, and Fig. 23ᵇ is a vertical elevation. Fig. 24 is a longitudinal section of the upper part of the reel shown in Fig. 23 showing the rubber receptacle through which the cords or threads pass and the valves therefor; Fig. 25 is a similar view of a similar reel adapted to the use of the tape.

In the figures relating to fabric, 1, 1, are groups of rubber coated cords or threads composed of a multiple number thereof and adhering together in parallel rows. These are designed to run in a uniform direction preferably at an angle of 45° to the edge of the fabric, or if the fabric is tubular at an angle of 45° to any longitudinal surface line parallel to the longitudinal axis thereof. Interlaid alternately above and below these groups of cords or threads and at an angle thereto are shown the fibrous bands 2 2, which may be tape spaced apart and interlaid alternately above and below single groups of cords or threads in a predetermined manner.

The tape bands are preferably formed of thin open meshed material so as to permit the rubber employed in coating them to penetrate them thoroughly, and to connect them elastically with the groups of cords or threads. The tape bands are in this manner interlaid, preferably so as not to increase materially the weight or thickness of the fabric but are so disposed as to connect the groups of cords or threads together, and to give continuity to the fabric. The bands of tape serve also in addition to their use as a reinforcing means to connect the groups of cords or threads together so as to distribute widely and uniformly throughout the fabric a sudden blow or shock received upon any part thereof, as from a force attacking the exterior surface of, or from internal pressure, so that the cords or threads will not separate laterally. Otherwise there could be no greater means of adhesion between them than would be provided by the vulcanized substances, such as rubber, which cements them together. The bands of tape are so interlaid as to give the greatest continuity to the fabric compatible with the least resistance to expansion or flexure, of the fabric, and hence can be laid at a wide angle relatively to the angle of laying the groups of cords or threads or may be laid at any desired angle thereto.

As shown in Fig. 1 the bands of tape 2 are laid at an angle of 45° crossing the groups of cords or threads 1 at an angle of 90°. A layer of this character of construction superimposed upon a layer in which the elements are reversed in position and the groups of cords or threads and bands of tape in one layer cross those of the adjoining layer or layers, at right angles, may be used and the layers do not interfere with the flexibility of the fabric to any extent and obtain a most valuable result in the increase of strength.

In Figs. 2 and 3 the groups of cords or threads 1 are shown running at an angle of 45° to any longitudinal surface line, and the bands of tape 2 cross them running at an angle of 30° to the said line. This construction makes the groups of cords or threads shorter than the bands of tape and hence any excessive shock or strain would be received first directly upon the cords or threads and the bands of tape would not only connect the groups of cords together but also serve as a reinforcing means to distribute the shock or strain throughout the fabric, or through a large portion of it in the vicinity of the part struck or strained, and thus tend to prevent rupture thereof at any one point.

In Fig. 4 is shown a form of fabric of two layers in which the bands of tape in both layers are designed to run at an angle of 30° to the longitudinal edge of the fabric, and in the same direction, and the groups of cords or threads run at an angle of 45° to the longitudinal edge of the fabric and those in only one layer run at angle of 90° to those in the other layer thus combining the layers shown in Figs. 2 and 3. In this mode of construction of the fabric the tape bands run all in the same direction in all layers, and at a less angle to the longitudinal edge than that of the groups of cords or threads and hence are much longer than the cords or threads. The effect of this arrangement is to lessen the shock upon the shorter cords or threads without injury to the reinforcing means. The tape bands since they all run in the same direction are also stronger to distribute the strain throughout the fabric. In all these forms of construction, when there are more than two layers, it will be found that in at least two layers the bands of tape will run in the same direction.

In Figs. 5, 5$^a$, 5$^b$, 5$^c$, 5$^d$, and 5$^e$ 6 and 7, the fabric is shown composed wholly of cord or thread, and the manner of laying the same is illustrated in the sectional views and particularly in Fig. 7. The series of rubbered cords 1, 1 are equally spaced apart to form a four group system of fabric, and the first wound upon the mandrel or drum at the required angle of approximately 45°. The spaces shown equal three cord diameters between the rows of cords. The second series of cords 1$^a$, 1$^a$, similarly spaced apart are then wound or laid on top of the first series, and at a right angle thereto or at an angle of 135° to any longitudinal surface line on that layer. A third series of cords 2, 2, are then interwound with the first series 1, 1, and parallel thereto but spaced half way between the members thereof. A fourth series 2$^a$, 2$^a$, are then wound or laid over and at right angles to the series 2, 2, but parallel to the series 1$^a$, 1$^a$, and half way between the members thereof; a fifth series 3, 3, are then wound or laid over series 2$^a$, 2$^a$, but parallel to series 1, 1, and over the spaces between the series 1, 1, and 2, 2; a sixth series 3$^a$, 3$^a$, is then wound or laid over series 3, 3, parallel to series 1$^a$, 1$^a$, and over the space between the series 1ª, 1ª, and the series 2ª, 2ª; a seventh series 4, 4, is then wound or laid over series 3ª, 3ª, parallel to series 2, 2, and over the space adjacent thereto; an eighth and last series 4ª, 4ª, is then wound or laid over series 4, 4, parallel to series 2ª, 2ª, and over the space adjacent thereto, thus completing the series of cords required.

The fabric is compressed so that the cords assume the positions shown in sections 5ª, 5ᵇ, 5ᶜ, 5ᵈ and 5ᵉ making a two ply fabric. The compression may be obtained by placing a greater tension upon the cords of the outer series while being wound upon the mandrel or by any desired means so that the cords of one series of the fabric will be forced into the spaces between the cords of the other series, so that the completed fabric will be of the diameters of only two cords or plies in thickness. The sections taken on different lines referred to clearly show this condition; all the cords are laid in any convenient manner in rubber or other adhesive material or may be previously given a sufficiently thick coating to embed them in rubber out of frictional contact with each other as predetermined. After the fabric is compressed the edges of the parallel lying cords of each of the four series engage each other at regular intervals while the members of the certain series wound in one direction are bent down and under the members of certain series running in the reverse direction, thus preventing the cords from sliding upon each other. In Fig. 5ª the cords or threads T take the place of the tape, and the cords or threads t take the place of the bands of cords 1, 1, in Fig. 1, and the same principle of interlaying and interwinding is observed in all the varieties of fabric. In Fig. 5ª, a section on a a Fig. 5, the cord T is always above, and cords t, t, are always below. In section b b Fig. 5ᵇ the cord T is always in the center and cords t, t, are alternately above and below cord T. In section c—c, Fig. 5ᶜ, cord T is alternately above one cord t and below three of cords t, t. In section d—d. Fig. 5ᵈ cord T is alternately below one cord t and above three of the cords t, t. In Fig. 5ᵉ section e—e, cord T is always below the cords t, t. In this form of construction all the elements are single cords or threads and a fabric of unusual strength is produced, applicable to unusual strains of all kinds, internal and external.

The fabric shown in Fig. 8 is composed solely of bands comprising each a multiple number of cords or threads, the bands T' taking the place of the tape, and the bands 1, 1, being similar to those shown in Fig. 1. This construction produces also a very strong fabric.

The fabric shown in Fig. 9 shows a combination of bands or cords 1, 1, and of tape 2, 2.

This type of construction is capable of an infinite variation in the manner of arrangement of the various elements and combinations of layers according to the character of the fabric it is desired to produce, for instance in Fig. 13 is shown a portion of a fabric, where one layer is shown composed of transversely or circumferentially laid bands or groups of two cords or threads each, and is provided with tapes 2 and 3 which are interlaid with each other and with the bands of cords or threads, and the bands of tape cross each other at 90°, and cross the cords or threads in the same layer at approximately 45°, thus providing a form of tubing in which all parts are interlaid and interwound together without affecting the flexibility of the fabric, and are capable also of enduring longitudinal strain.

In Fig. 10 a mandrel M is shown and a lining L of rubber. Upon this lining is shown a layer of fabric similar to that shown in Fig. 1. The second layer is similar to that shown in Fig. 13 and the third layer is similar to the first layer, but with the elements reversed in direction of laying. The layers are held together by means of rubber and the strength and flexibility of the fabric is very great. Fig. 11 is a combination of the fabrics shown in Figs. 5 and 13, except that in the central layer there are four threads in each group, and the outer layer P is composed wholly of tapes interlaid in the same manner as the fabric shown in Figs. 8 and 9. In Fig. 12 the combination shown includes first a fabric P composed wholly of tape, an intermediate fabric of crossed tape and transverse bands of cord or tape similar to the intermediate layer shown in Fig. 11, and a fabric P' composed wholly of tape.

The adaptability of the fabric to all requirements of use, and internal and external pressure is substantially unlimited, and the combinations possible in interlaying the crossing elements in each layer, and modifications in the combinations of layers with each other, are practically without end.

The character of the machinery required to carry out the process for forming this fabric is exemplified in Figs. 18 to 29 inclusive and the process of interlaying the several elements may be described in connection with a description of the type of machine, as follows:—This machine may consist of a series of four rings, "a", "b", "c", and "d", as shown in Figs. 19 to 29, each holding forty-four tubes of 1/16" thread, and three rings, "e", "f", and "g", carrying two spools of 3/4" tape each, a ring holding tape following a ring holding thread. These rings or reels are all the same size diametrically and are held in place by rolls R, R, R, mounted on brackets, so that one roll comes directly underneath each ring and one on each side of each ring, above the horizontal center line of the ring, thus forming a complete three point support for rotation as shown by drawing. The four rings holding thread are rotated each in the same direction, accomplished by means of gear teeth U on the outside circumference of each ring meshing with a pinion V on a driving shaft, W. The shaft extends along the machine so each reel is driven from the same shaft by pinions mounted thereon at the positions required. The tape reels are driven from pinions Z on the same shaft through an intermediate gear Z' and pinions Z² which thus causes the tape rings to rotate in the opposite direction to the thread rings.

The fabric is formed upon a cylindrical mandrel M formed of a succession of sections propelled longitudinally through the machine by means of suitable friction rolls, F. The mandrel is formed of short sections joined together end to end in any suitable manner and support before reaching the friction driving rolls and after the fabric is formed upon the mandrel by means of three rolls, f, f, f, at 120° angle to each other and adjustably mounted on a bracket f². The center line of the mandrel is shown as the center of rotation of the thread and tape rings, the latter rotating in a plane at right angles to the center line of the mandrel.

The tubes of thread are arranged in a circle concentrically to the mandrel and equally spaced on this circle, each tube extending outward in a line parallel to the mandrel. In the machine under consideration the number of tubes on each thread ring is forty-four, twenty-two being arranged on each side of the ring, equally spaced on each side but one side alternately spaced from the other. The threads from the eleven tubes occupying each quarter of the thread ring are concentrated in a guide strip g after passing through a tension device h. The holes in this guide strip through which the thread passes, are spaced at a distance apart equal to 1/176 of the circumference of a circle which would pass through these holes, the center being the center line of the mandrel. There are four of these guide strips to each thread ring located at 90° from each other, around the mandrel. The threads from each eleven tubes are grouped in passing through the guides and are laid side by side on the mandrel by the rotation of the ring. To cover the whole of a mandrel of four inches diameter would take approximately 176 threads of 1/16 inches diameter each and laid at an angle of 45° to a longitudinal surface line so that eleven threads would only cover 1/16 of the surface. The forty-four threads on each thread ring cover ¼ of the surface so that the four thread rings in one revolution at an angle of 45° will extend the threads on the surface of the mandrel a pitch distance equal to the circumference of the mandrel.

By having the mandrel move longitudinally a distance equal to its circumference during one revolution of the tape rings the threads are laid at an angle of 45° to a longitudinal surface line of the mandrel. The number of threads required is found by calculation and is governed by the diameter of the thread, the angle at which it is desired to lay the thread, the diameter of the mandrel, and the longitudinal movement of the mandrel.

The groups of thread from the first ring "a" as shown in Fig. 18 only cover ¼ of the surface of the mandrel and in one revolution therefore the groups of threads are laid in four divisions, the spaces between all groups of threads being just wide enough to receive the groups of threads subsequently laid by the other three rings. This spacing of the strips is accomplished by the location of the guides which are spaced at 90° from each other around the thread ring in connection with the afore-mentioned longitudinal movement of the mandrel. These groups of thread laid by the first reel are numbered 1—2—3 and 4 on the mandrel in Fig. 18. On top of these four groups of thread are laid bands of tape from two tape spools o, o, located diametrically opposite each other on the tape reel e which follows the thread ring a as previously described, and revolves in the opposite direction, and at such a predetermined speed of revolution as to lay the tapes at an angle of 45° to a longitudinal surface line of the mandrel and at 90° from the groups of thread already laid.

The thread ring "b" is exactly like ring "a" but that it is turned through an angle of 45° around the mandrel from that occupied by ring "a" so that the four groups of thread when laid will occupy the center of the spaces between the groups 1 and 2, 2 and 3, 3 and 4, 4 and 1, respectively on the mandrel. These groups of thread lay on top of the tapes as laid by the tape reel. The tape reel f is exactly like reel e but is advanced 60° around the mandrel from the position occupied by reel e and so spaces the tapes that when all are laid they are equidistant on the mandrel. These two tapes are laid on top of the groups of thread from reel a and b. Thread reel c is exactly like reels a and b but is advanced only 22½° around the mandrel from the position occupied by reel a in the same direction as reel b was advanced, therefore the groups of threads laid by reel c will lie in the space between the groups of thread from reels a and b and on top of the tapes previously laid. The reel g is exactly like reels e and f but is advanced through an angle of 120° around the mandrel from the position occupied by reel $e$ and in the same direction as reel $f$ was advanced. The tapes from this reel are laid on top of the groups of threads laid by reels $a$, $b$ and $c$. All the tapes are now equidistant from each other on the mandrel. Thread reel $d$ is exactly like reel $a$ except it is advanced $67\frac{1}{2}°$ around the mandrel from the position occupied by ring $a$, therefore the groups of thread are laid in the vacant spaces left between groups from reels $b$ and $a$. These groups of threads are laid on top of all the tapes previously laid. This covers the entire circumferential surface of the mandrel, every space being filled, and gives a fabric of thread interlaid and interwound with tape, thus reinforcing and completing one layer of fabric. Groups of threads from reel $a$ are under six tapes, groups of threads from reel $b$ are over two tapes and under four, groups of thread from reel $C$ are four tapes and under two, while groups of thread from reel $d$ are over all six tapes. By adding to the number of the tape and thread reels, or grouping or rearranging them as desired, variations can readily be accomplished in the arrangement of elements in a fabric of this general character.

Fig. 13 shows a $2\frac{1}{2}''$ hose whose outside spiral layer of material is composed of groups of threads ($2\frac{1}{8}''$ threads per group), laid adjacent to and parallel to each other, interlaid and interwound with tapes $\frac{1}{4}''$ wide, laid at 90° to each other and at 45° to the horizontal center line of the hose.

In order to lay the thread in groups as shown, with the accompanying tapes binding the threads together, four thread reels and three pair of tape reels are required.

The four thread reels rotate about the hose in the same direction while the tape reels of each pair rotate in opposite directions, thus having three tape reels rotating in one direction and three tape reels rotating in the opposite direction.

Two tubes of thread are required for each thread reel, the two threads are brought together in a guide as before side by side and thence pass to the mandrel upon which the hose fabric is formed.

The mandrel is propelled longitudinally through the machine and the thread and tape reels rotate about it. The number of revolutions of the thread reel as compared to the speed of propulsion of the mandrel is such that the groups of threads from the reels just cover the mandrel. If two $\frac{1}{16}''$ threads are laid from each reel the pitch of the group of threads from each reel would be $\frac{1}{8}''$, as is shown by Fig. 3. The group of threads from reel "$a$" is laid first, at $\frac{1}{2}''$ pitch as shown, such that three more groups of two threads each may be laid between the coils. Then the tape from the first pair of tape reels, is laid on top of the thread from one reel. The spools of tape on each reel are diametrically opposite each other, while the spools of tape on one reel of the first pair are at 90° to the spools of tape of the other reel. Also one reel of this pair rotates in the opposite direction to the other reel. The speed of rotation of the three pair of tape reels as compared to the speed of propulsion of the mandrel is so determined that the tape is laid at an angle of 45° to the longitudinal surface line of mandrel, the tape from one reel of each pair being laid at an angle of 90° to the tape of the other reel of the same pair. The tape spools on the tape reels of the first pair being at 90° from each other, the tape is equally spaced about the mandrel. After the tape is laid from the first pair of tape reels, another group of threads is laid half way between the coils previously laid. This is accomplished by having the guide for the second group of threads at the same distance from the center of the mandrel as the group of threads on the first thread reel and at an angle around the mandrel of 180°. Thus the four tapes laid by the first pair of tape reels are over the thread from first thread reel and under the thread from the second thread reel. Then the four tapes from the second pair of tape reels are laid on top of the thread from the first and second thread reels. The spools of tape on each reel of the second pair are diametrically opposite and at the same distance from the center of the mandrel as were the spools of tape on the first pair of tape reels. The spools of one member of this second pair of tape reels are at 90° around the mandrel from the spools on the other member, while each spool is advanced 30° in the same direction around the mandrel from the spools of tape on the first pair of tape reels. Thus while these four tapes on the first and second tape reels are equally spaced about the mandrel as regards each other, they are also each laid at a distance of $\frac{1}{12}$ the circumference of the mandrel respectively from the four tapes previously laid. Next the group of threads from the third thread reel is laid in the vacant space adjoining the first group of threads, thus being laid on top of the tapes from both the first and second pair of tape reels.

There are two tubes of thread on the third thread reel the thread being grouped and placed at a distance from the center of the mandrel, as on the second thread, but located 90° around the mandrel from the group of threads on the first thread reel but in the same direction as the group of threads on the second thread reel. Next are laid the four tapes from the third pair of tape reels, these being like the tape reels previously described except that the angular location of the spools of tape around the mandrel is 30° from the corresponding spools on the second pair of tape reels, and in the same direction, thus the twelve spools of tape on the three pair of reels are at an angle from each other around the mandrel of 30°. These four tapes are laid on top of the thread from first, second and third thread reels and in a manner like that described for the first and second pair of tape reels. Then finally is laid the group of threads from the fourth thread reel. This reel is like first, second and third thread reels except in the angular location around the mandrel of the guide for the group of threads, which is 270° from that of first thread reel and in the same direction as that of the second and third thread reels. This group of threads being on top of the eight tapes from the second and third pair of tape reels. The four tapes from the first pair of reels are thus over the group of threads from the first thread reel and under those from the second and third and fourth thread reels. The four tapes from the second pair of reels are thus over the groups of threads from the first and second thread reels but under the groups of threads from the third and fourth thread reels. The four tapes from the third pair of tape reels are thus over the groups of threads from the first, second and third thread reels, but under the group from the fourth thread reels. This interlaying and interwinding of the threads and tapes completes one layer of fabric, which may be combined with any of the other fabric layers herein described.

The general specifications for an air brake hose require that it should be substantially 1⅜" inside diameter in most cases, 22 to 24" long and about 2⅛" outside diameter. It has a rubber core about 3/32" thick, a fibrous material composing the wall of the hose, and an outside rubber covering about 1/16" thick and can readily be made of this improved fabric by the process of the character described.

The machine described is well adapted to carry out this process and includes 1⅜" diameter steel mandrels M, 22 to 24 inches long which are joined together end to end. First the rubber lining is applied, second a layer of 1/16" thread, side by side, at an angle of 45°, to a longitudinal surface line of the mandrel is applied, then another layer of 1/16" threads, side by side, at an angle of 45°, but at 90° to the thread previously laid, and fourth a layer of circumferentially laid 1/16" threads side by side but interlaid and interwound with tapes, are respectively laid upon this mandrel, all the threads and tapes being thoroughly coated with liquid rubber cement.

In taking up the machine shown in detail, the mandrel M deserves first consideration. This consists of a piece of 1⅜" diameter, cold drawn, seamless, steel tubing of about 3/16" walls, highly polished and each end fitted to receive a specially made plug J, and having keys diametrically opposite so that the plugs cannot rotate in the mandrel. This plug is about 8" long, and is double, that is, it has a center 1⅜" diameter, polished, 1" long, and two ends 1" diameter and each 3" long with key-ways K diametrically opposite. Either end of any of these plugs is a close sliding fit in either end of any of the mandrels. These mandrels are joined one to the other at the rear of the machine and are supported and guided, see Fig. 24, by three rolls $f$, $f$, $f$, at 120° to each other around the mandrel, these rolls being supported in a forked shaped casting $f'$, carried by a rod $f$, free to turn in a bushing $f$ which screws into a circular frame $f$ surrounding the mandrel, but spaced it by five or six inches all around. These mandrel supports and guides and brackets $f$ therefor are distributed at intervals of about 4 feet apart along the machine, throughout its entire length.

The mandrels are propelled through the machine by means of 6¼" diameter friction rolls, F F see Figs. 21 and 22 operating in a horizontal plane through the center of the mandrel. There are several sets or pairs of these friction rolls. Each roll is mounted on the top end of a vertical shaft S turning in a bearing in an adjustable lever, having a spur gear S' on its lower end engaging another spur gear S upon another vertical shaft, upon which the aforesaid lever is free to turn. This latter shaft is fastened securely to a supporting bracket. Gears S and $S^2$ are equal and mesh together. One vertical shaft carries a lever gear S meshing with gear $S^6$ which through a train of gears is actuated by a friction roll $S^6$ and disk $S^7$. The second lever mentioned carries on its extreme end but on a level below the mandrel an eye bolt B', whose threaded end passes through an elongated hole in the first lever and which carries a powerful helical spring $b^2$ resting against the first lever, and which is compressed, and thereby draws the levers together and forces the friction rolls F against the mandrel by means of a nut $b^3$ upon the eye bolt and is locked by a lock nut $b^4$. These rolls are thus pressed against the mandrel with a pressure of about 100 lbs., thus providing from each pair of rolls a force tending to push the mandrel through the machine of about 40 pounds.

The power is supplied to the vertical shaft $S^3$ carrying gear $S^2$ through a pair of miter gears from the horizontal shaft $S^8$ called the bevel gear shaft. Next is provided an inclosed box, fastened to a supporting bracket, containing powdered soapstone which the mandrel passes having a felt wiper or cleaner upon the end where the mandrel enters and a corresponding ring of felt upon the end where the mandrel leaves the box to wipe off any superfluous soapstone but not tight enough on the mandrel but that a good coat of soapstone is applied. Upon each side of the web of each of these gears U is fastened a circular hollow ring or channel U-shaped of section holding liquid rubber cement as shown at N, Figs. 27, 28 and 29. Upon the outer surface of this ring or rubber tank and on a 30″ diameter circle concentric with the mandrel, equally spaced, are thirteen holes N′ drilled to receive brass tubes upon each of which is tightly pressed a tube $N^2$ of $\frac{1}{16}$″ diameter thread, the tube being about $5\frac{1}{2}$″ diameter, and 6″ long, holding about 3000 feet of thread. In Fig. 26 the ring at these points is provided with bosses on its inner surface so the holes will be deep enough to provide a bearing without going through the metal. The other end of the tube is supported by means of an arm 10 fastened to the reel by means of a pin 11 screwed into the reel, the arm being free to swing on this pin, but capable of being locked in position, and also free to have a limited longitudinal movement on the pin against the pressure of a helical spring 12. This construction is shown in Fig. 26 in the preferable form, thus this arm may be moved longitudinally, releasing the tube swung out of the way, the empty tube removed, a full tube put in its place, and the arm replaced in position without having any loose parts to remove or unfasten. In Figs. 27, 28 and 29, attached to the rubber tank and communicating with it by a disk valve $N^3$ are four similar tanks $N^4$, arranged at equal distances from each other and from the mandrel, the same number on each side, of the reel, but those on one side advanced respectively from those on the other side by an angle of $22\frac{1}{2}°$. The thread from the tubes passes through these applicator tanks at an angle of 45° to the horizontal center line of the mandrel, but tangent to the outside rubber covering. These threads pass through guide eyelets of wire, $N^5$ then between the halves of a tension or compression device $N^6$ one half then held stationary in a slot in the applicator tank casting by flat gibs screwed thereto and the other held in compression against its mate by a helical spring $N^7$ attached to a pin $N^8$ on the stationary member. This compression member is free to slide in the previously mentioned slot, but is held otherwise by means of flat gibs $N^9$ screwed to the tank. These compression parts have a hole slightly smaller than the diameter of the thread, cut half in each, and the thread passes through this and through a larger hole in the applicator tank covered by these compression or tension members. The threads from the tubes pass through these applicator tanks, the threads being at an angle of 27-9/13° to each other. As the thread comes out of the applicator tanks it passes through a device $N^{10}$ called the applicator, like the compression device except that the hole is slightly larger than the diameter of the thread in order to give it a good, cylindrical coating of rubber.

It is obvious that this principle of construction is applicable to the making of automobile tires and casings, as well as hose and to the making of flat fabric as by cutting the completed layers from the mandrel upon a longitudinal surface line, and spreading them out, by this method a fabric can be constructed which may be made practically of any length and width according to the diameter and length of the mandrel or drum upon which it was formed, also an interlaid and interwound fabric can be thus constructed of a type that could not be produced upon a loom or braiding machine of any known character, and will be within the scope of the claims.

The prime accomplishment of this process is to produce by means of a rotary or twisting action an interlaid or interwound fabric, which when cut from the mandrel contains single cords or threads, or groups of cords or threads or a combination of groups of threads and tapes, laying at the precise angle to the edge desired, so that it can be readily stretched or molded to the shape required especially for automobile tire construction.

The bands of reinforcing material adapted to be interlaid and interwound, with the cords or threads or with bands of cords or threads or with other reinforcing bands may be made of any material or fabric, but are preferably formed of tape for the sake of the advantage gained by the selvage edge which will not ravel or stretch and the body portion is more loosely wound and absorbent than the edge. Hence a layer formed entirely of tape of any width wound upon a mandrel at any angle to any thickness is superior in strength to a fabric layer, formed of material cut upon the bias and wrapped about the mandrel, or applied thereto at any angle. This tape layer may be combined with any one of the layers shown in the drawings, such as with a layer of spirally or transversely or angularly laid cords or threads, or with another tape layer of any character, the use of the tape possessing a decided advantage over other fabrics for the reason described.

I claim—

1. In a laminated fabric, a series of parallel equally spaced fibrous members, a second similar series of fibrous parallel equally spaced members crossing the said first series at an angle, a third series of equally spaced fibrous members wound or laid thereon over the spaces between the members of the first series, a fourth series of similar equally spaced fibrous members wound or laid parallel to said second series and over the spaces between the said series the said fabric compressed together whereby the said second and fourth series of fibrous members are interwound or interlaid between the members of the first and third series to fill all spaces between them and an adhesive vulcanizable binding material for said fibrous members.

2. In a laminated unwoven fabric formed of equally spaced cohering fibrous members, series of parallel equally spaced fibrous members running in one direction and alternately wound or laid series of parallel equally spaced members running at an angle thereto, the spaced parallel series running in one direction being wound or laid at different times with intervening similar series running in the other direction, each series as wound or laid being interwound or interlaid with parallel series, the fabric finally compressed, whereby the spaces between the bands are all completely filled, and the edges of the fibrous members of one series engage the edges of the parallel fibrous members of other series, and an adhesive vulcanizable binding material for said fibrous members.

3. In a laminated unwoven fabric composed of cohering fibrous members, a plural series of parallel equally spaced fibrous members running in one direction, and plural series of parallel equally spaced fibrous members running at an angle thereto, a series running in one direction alternating with a series running in the other direction, the subsequently laid series laid over the spaces between the first laid series until all spaces are filled, the fabric afterward compressed to force the subsequently laid series into the spaces between parallel first laid series.

4. In a laminated unwoven fabric composed of cohering regularly spaced twisted cords, a first laid series of regularly spaced cords, a second series of regularly spaced cords crossing the first series at an angle, subsequently wound or laid series of equally spaced cords running alternately parallel with the first series and with the second laid series, the subsequently laid series of regularly spaced cords being parallel with and adapted to be interwound or interlaid with the first and second wound or laid series, to form a two ply fabric, the cords of each embedded in the spaces between the cords of parallel series.

5. In a laminated, unwoven fabric composed of cohering regularly spaced twisted cords, a first wound or laid series of parallel regularly spaced cords, a second similar series wound or laid at right angles therewith, subsequently wound or laid series alternately parallel with the first and second wound or laid series, the cords of the subsequently wound or laid series interwound or interlaid with the cords of the first and second laid series and the fabric compressed, the cords in each series being alternately in one ply and in the other whereby the spaces between the regularly spaced cords are filled.

6. In a laminated, unwoven fabric, a layer composed of series of parallel regularly spaced fibrous members, and series of parallel regularly spaced fibrous members running at an angle thereto, the fibrous members of one series embedded in the spaces between the fibrous members of parallel series to form an unbroken fabric of even surface and uniform thickness, and an adhesive and vulcanizable material binding the said fibrous members together.

7. In a fabric, series of equally spaced parallel bands of threads cohering together, and laid in one direction, to form spaces and series of similar bands interlaid in alternately parallel and crossing layers therewith to form a ply fabric, each band having a binding of rubber incorporated therewith and all bands cohering together and compressed to fill all spaces between said spaced bands.

In testimony whereof, I hereunto set my hand this 27th day of January 1910.

LAWRENCE A. SUBERS.

In presence of—
 ERNEST MOSMAN,
 WM. M. MONROE.